US007712102B2

(12) United States Patent
Herington et al.

(10) Patent No.: US 7,712,102 B2
(45) Date of Patent: May 4, 2010

(54) SYSTEM AND METHOD FOR DYNAMICALLY CONFIGURING A PLURALITY OF LOAD BALANCERS IN RESPONSE TO THE ANALYZED PERFORMANCE DATA

(75) Inventors: Daniel E. Herington, Dallas, TX (US); Bryan Backer, Pasadena, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1412 days.

(21) Appl. No.: 10/902,763

(22) Filed: Jul. 30, 2004

(65) Prior Publication Data

US 2006/0026599 A1 Feb. 2, 2006

(51) Int. Cl.
G06F 9/46 (2006.01)
G06F 15/16 (2006.01)
G06F 15/173 (2006.01)

(52) U.S. Cl. .............. 718/105; 709/201; 709/203; 709/223; 709/226

(58) Field of Classification Search ......... 718/100–105; 709/201–203, 223–226
See application file for complete search history.

(56) References Cited

U.S. PATENT DOCUMENTS

| 6,317,416 | B1 * | 11/2001 | Giroux et al. ............... 370/232 |
| 6,442,583 | B1 * | 8/2002 | Eilert et al. ................. 718/104 |
| 6,738,813 | B1 * | 5/2004 | Reichman ................... 709/224 |
| 6,823,382 | B2 * | 11/2004 | Stone .......................... 709/224 |
| 6,859,834 | B1 * | 2/2005 | Arora et al. ................. 709/227 |
| 6,883,029 | B2 * | 4/2005 | Karamanolis et al. ....... 709/226 |
| 7,062,559 | B2 * | 6/2006 | Yoshimura et al. .......... 709/226 |
| 7,076,553 | B2 * | 7/2006 | Chan et al. .................. 709/226 |
| 7,272,653 | B2 * | 9/2007 | Levy-Abegnoli et al. .... 709/229 |
| 7,310,674 | B2 * | 12/2007 | Mitsumori .................. 709/226 |
| 7,328,259 | B2 * | 2/2008 | Srinivasan et al. .......... 709/223 |
| 7,392,314 | B2 * | 6/2008 | Betzler et al. ............... 709/226 |
| 2002/0044529 | A1 * | 4/2002 | Giroux et al. ............... 370/232 |
| 2002/0069279 | A1 * | 6/2002 | Romero et al. .............. 709/225 |
| 2002/0112023 | A1 * | 8/2002 | Karamanolis et al. ....... 709/217 |

(Continued)

FOREIGN PATENT DOCUMENTS

JP 09-282287 10/1997

(Continued)

OTHER PUBLICATIONS

Ampornaramveth et al., "Optimization of Cluster Web Server Scheduling From Site Access Statistics", Faculty of Computer Engineering, Kasetsart University, Bangkk, Thailand, 2002, pp. 1-10.*

(Continued)

*Primary Examiner*—Meng-Ai An
*Assistant Examiner*—Jennifer N To

(57) ABSTRACT

In one representative embodiment, a system for operating load balancers for multiple instance applications comprises a plurality of cluster nodes for executing applications, wherein at least a subset of the plurality of cluster nodes executes multiple applications and includes respective resource allocation modules for assigning resources between the multiple applications in response to performance data associated with the multiple applications, a plurality of load balancers for distributing application transactions between the plurality of cluster nodes, and a configuration process that analyzes performance data associated with the multiple applications and dynamically configures the plurality of load balancers in response to the analysis.

20 Claims, 3 Drawing Sheets

U.S. PATENT DOCUMENTS

| | | |
|---|---|---|
| 2002/0129127 A1* | 9/2002 | Romero et al. ............... 709/220 |
| 2003/0023669 A1* | 1/2003 | DeLima et al. ............. 709/203 |
| 2003/0037092 A1* | 2/2003 | McCarthy et al. ........... 709/104 |
| 2004/0054780 A1 | 3/2004 | Romero |
| 2004/0162901 A1* | 8/2004 | Mangipudi et al. .......... 709/225 |
| 2005/0120095 A1* | 6/2005 | Aman et al. ................ 709/219 |
| 2005/0188075 A1* | 8/2005 | Dias et al. .................. 709/224 |
| 2005/0278453 A1* | 12/2005 | Cherkasova ................. 709/231 |
| 2006/0031374 A1* | 2/2006 | Lu et al. .................... 709/207 |
| 2007/0294387 A1* | 12/2007 | Martin ...................... 709/224 |

FOREIGN PATENT DOCUMENTS

| | | |
|---|---|---|
| JP | 2004-110791 | 4/2004 |
| WO | WO-03/063447 | 7/2003 |

OTHER PUBLICATIONS

Satake, Shinsuke et al., "A Dynamic Load Balancing Method for Widely Distributed Web Systems", *IEICE Technical Report, The Institute of Electronics Information and Communication Engineers*, vol. 103, No. 388,(Oct. 17, 2003),pp. 57-60.

* cited by examiner

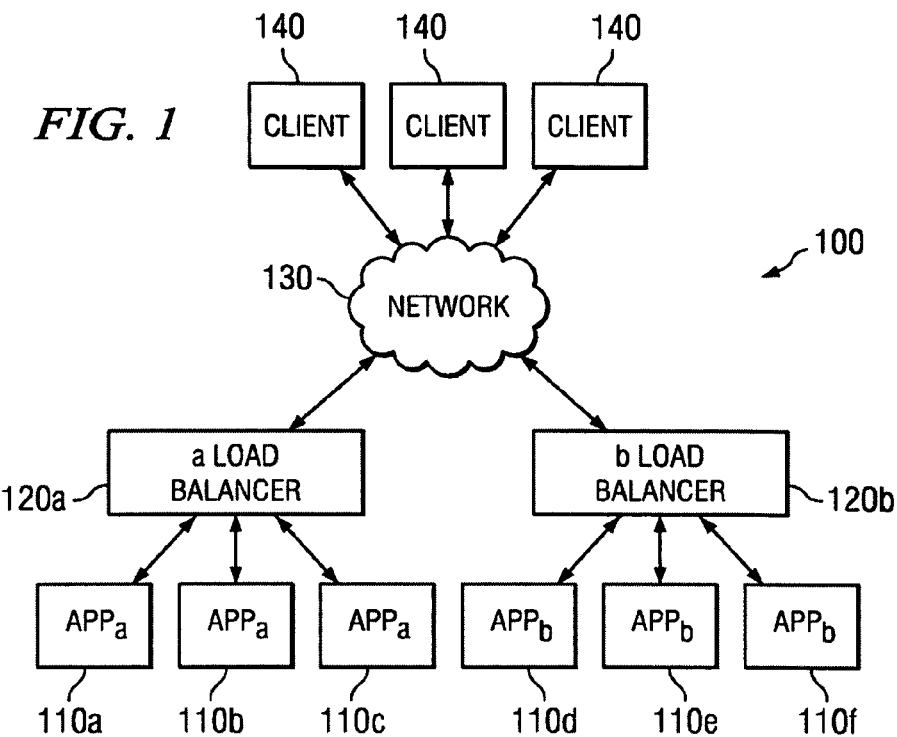

FIG. 1

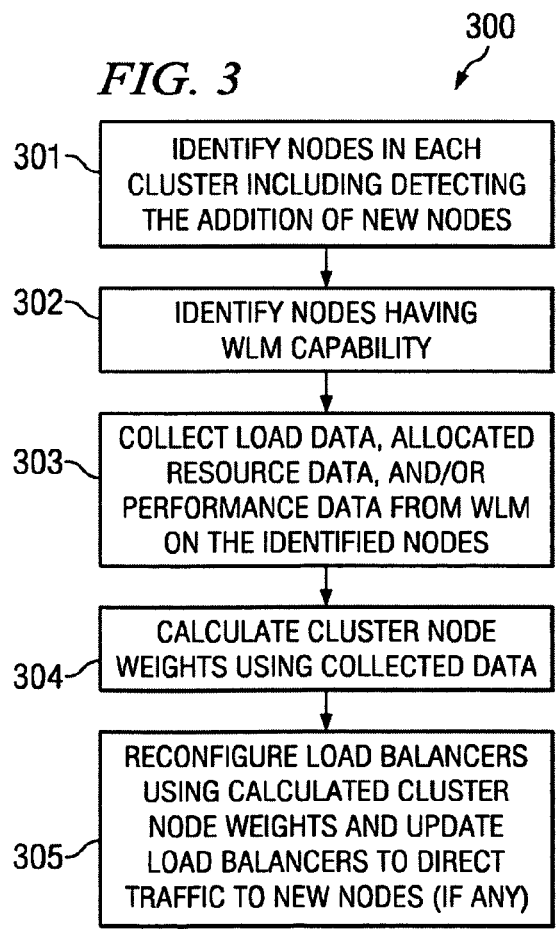

FIG. 3

- 301: IDENTIFY NODES IN EACH CLUSTER INCLUDING DETECTING THE ADDITION OF NEW NODES
- 302: IDENTIFY NODES HAVING WLM CAPABILITY
- 303: COLLECT LOAD DATA, ALLOCATED RESOURCE DATA, AND/OR PERFORMANCE DATA FROM WLM ON THE IDENTIFIED NODES
- 304: CALCULATE CLUSTER NODE WEIGHTS USING COLLECTED DATA
- 305: RECONFIGURE LOAD BALANCERS USING CALCULATED CLUSTER NODE WEIGHTS AND UPDATE LOAD BALANCERS TO DIRECT TRAFFIC TO NEW NODES (IF ANY)

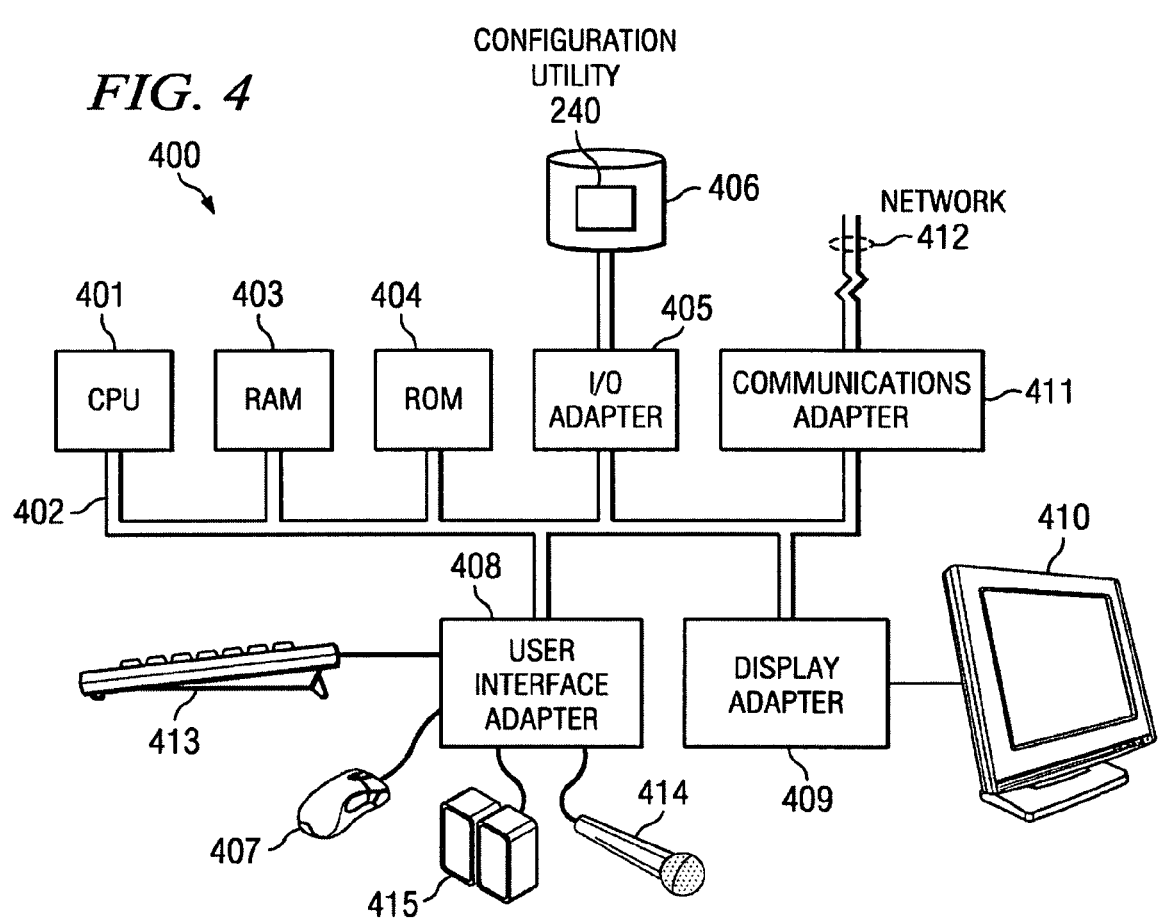

SYSTEM AND METHOD FOR DYNAMICALLY CONFIGURING A PLURALITY OF LOAD BALANCERS IN RESPONSE TO THE ANALYZED PERFORMANCE DATA

FIELD OF THE INVENTION

This application is generally related to operating load balancers for multiple instance applications.

DESCRIPTION OF RELATED ART

Recent application architectures frequently support clustered execution of applications. Clustered execution refers to the execution of an application as a collection of instances (identical instances in most cases) on a set of systems (cluster nodes) such that the workload is distributed and balanced across those systems. If any particular cluster node fails, the workload continues on the remaining systems as usual or with some degradation in performance.

There are a number of advantages to clustered execution. For example, clustered execution provides higher availability, because the failure of a cluster node does not cause a complete application failure. Additionally, clustered execution typically results in lower costs, because expansion may occur on an incremental basis using smaller servers, instead of replacing a monolithic server with a larger one. For the same reason, faster scaling of the distributed application may occur.

SUMMARY

In one representative embodiment, a system for operating load balancers for multiple instance applications comprises a plurality of cluster nodes for executing applications, wherein at least a subset of the plurality of cluster nodes executes multiple applications and includes respective resource allocation modules for assigning resources between the multiple applications in response to performance data associated with the multiple applications, a plurality of load balancers for distributing application transactions between the plurality of cluster nodes, and a configuration process that analyzes performance data associated with the multiple applications and dynamically configures the plurality of load balancers in response to the analysis.

In another representative embodiment, a method comprises executing a plurality of applications on a plurality of cluster nodes, wherein at least a subset of the plurality of cluster nodes executes multiple applications, dynamically reassigning resources between the multiple applications in response to performance data associated with the multiple applications, distributing application transactions between the plurality of cluster nodes according to parameters, and dynamically configuring the parameters in response to performance data associated with the multiple applications.

In another representative embodiment, a computer readable medium comprises code for retrieving performance data associated with execution of applications on a plurality of cluster nodes, wherein at least a subset of the plurality of cluster nodes executes multiple applications, code for calculating multiple sets of cluster node weights using the performance data, and code for dynamically configuring load balancers using the multiple sets of cluster node weights to control distribution of application transactions to the plurality of cluster nodes.

BRIEF DESCRIPTION OF THE DRAWINGS

FIG. 1 depicts a cluster system.
FIG. 3 depicts a flowchart for controlling distribution of application transactions in a cluster system according to one representative embodiment.
FIG. 4 depicts a system that may be used to implement one representative embodiment.

DETAILED DESCRIPTION

Figure 2:
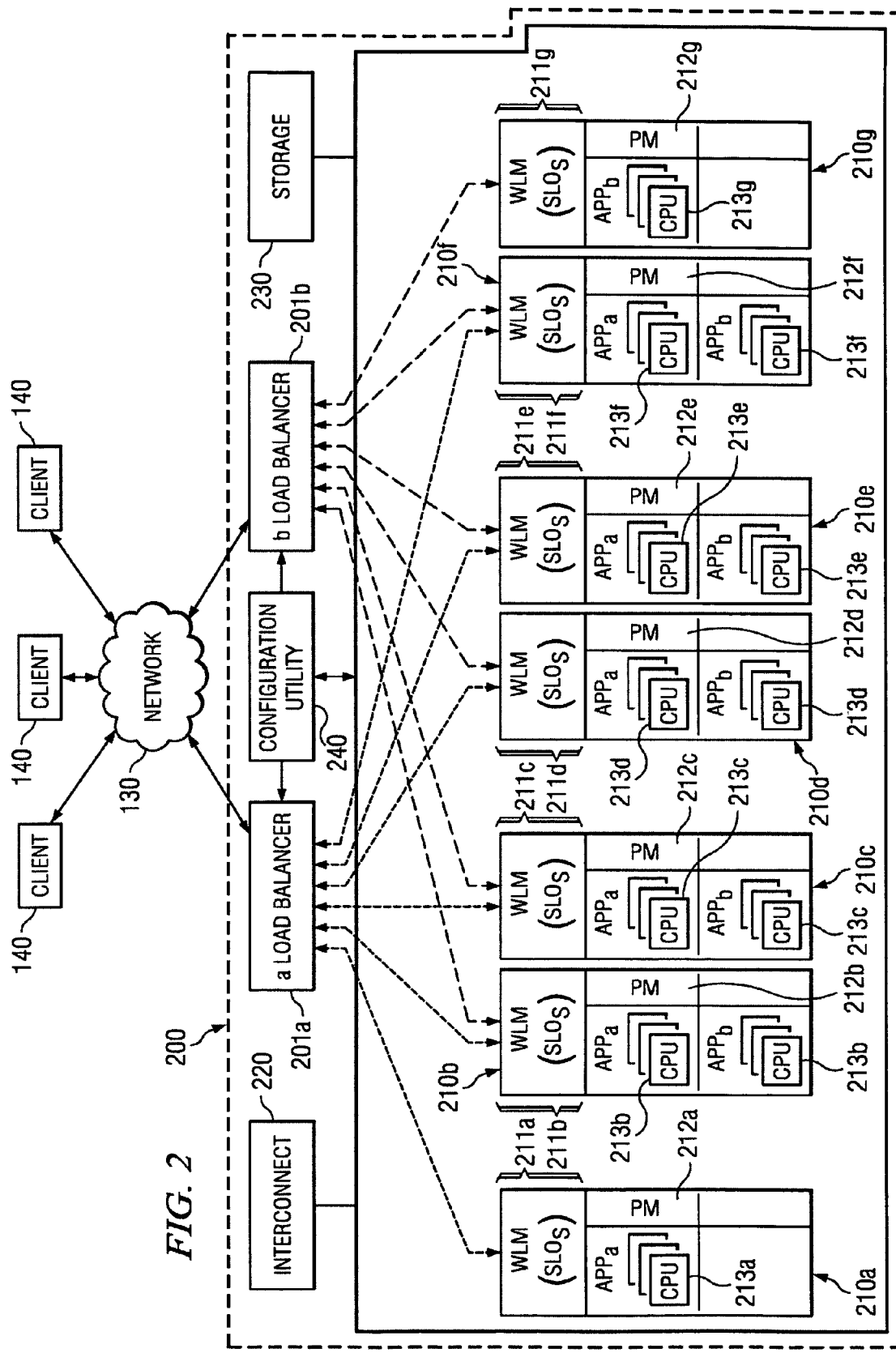
FIG. 2 depicts a cluster system according to one representative embodiment.

FIG. 1 depicts cluster system 100 according to known cluster system designs. Cluster system 100 comprises cluster nodes 110a-110c that each execute an instance of application "a." Cluster nodes 110a-110c form an "application cluster" that appears to be a single system to clients 140. Cluster system 100 also comprises cluster nodes 110d-110f that each execute an instance of application "b." Nodes 110d-110f form another application cluster that appears to be a single system to clients 140.

In general, the numbers of cluster nodes for the applications are selected according to the worst-case demand levels of the respective applications. Application transactions are generated by clients 140 and routed through network 130 to load balancers 120a and 120b. Load balancers 120a and 120b typically direct application transactions to particular cluster nodes 110 for processing using a weighted round-robin algorithm. Accordingly, when a large number of clients attempt to access a cluster application, the processing associated with those clients are distributed over the multiple cluster nodes and application performance is typically maintained at acceptable, albeit reduced, levels. If an application does not exhibit acceptable performance during peak loads, an additional cluster node may be added to cluster system 100 to obtain improved performance of the application. The respective load balancer 120 would then be manually readjusted in accordance with the relative capability of the new node 110 to the capabilities of the existing nodes 110.

Although cluster systems provide a number of advantages, cluster systems experience some limitations. When resources are selected according to the worst-case demand levels, cluster nodes can experience low overall utilization rates. Specifically, if peak application loads are relatively short in duration, cluster nodes associated with a particular application can be idle for a signification portion of time. Accordingly, the idle system resources are wasted.

One representative embodiment enables the idle or otherwise underutilized system resources to be managed in an efficient manner. In one representative embodiment, some cluster nodes execute multiple applications and these cluster nodes include respective performance monitors that analyze the performance of the multiple applications. The performance monitor communicates performance data to a workload manager. The workload manager readjusts the allocation of processor resources or other resources between the applications in response to the performance data and service level objectives. Accordingly, applications that are more heavily loaded at any particular moment receive additional processing resources or other resources to satisfy the increased load.

A configuration utility of an embodiment periodically queries the various cluster nodes to determine which applications are being executed by each respective node. Also, the various instances of the work load managers are queried by the configuration utility to obtain performance information related to the various applications. The load characteristics associated with the applications on the respective nodes may also be analyzed by examining a workload queue or other suitable queue. Additionally, the configuration utility may identify the resources assigned to the various cluster nodes. Using the obtained information, the configuration utility calculates weighting coefficients to distribute application transactions across the cluster nodes. The configuration utility communicates the calculated weights to the load balancers to control the distribution of transactions to the cluster nodes.

Thus, some representative embodiments enable a smaller number of nodes in a cluster system to be employed to support the same number of applications than would be employed using conventional cluster architectures. By causing multiple applications to be instantiated on some of the application nodes, a greater amount of resources are made available for the multiple applications without adding additional nodes. The resources may then be allocated in response to load demands. Specifically, as peak loads occur, additional processors and/or other resources can be assigned to the application experiencing heavy traffic. As resources are dynamically allocated, the load balancers are appropriately adjusted. Therefore, the dynamic assignment of resources enables improved application performance, because application transactions are specifically directed to the cluster nodes that have allocated additional resources for the processing of the respective transactions.

FIG. 2 depicts cluster system 200 according to one representative embodiment. Cluster system 200 includes a plurality of cluster nodes (shown as 210a-210g). Clustering generally involves hardware and/or software connectivity that facilitates modular computing. A cluster typically includes multiple instances of a suitable server cooperating with each other to provide increased application scalability and reliability. The multiple instances of a server that constitute a cluster may run on the same physical system or multiple physical systems. For example, each cluster node 210 may represent the virtual computing resources of a single physical system used to support a respective server. Alternatively, a separate physical platform could be used to execute each server.

As shown in FIG. 2, instances of application "a" are provided on nodes 210a-210f and instances of application "b" are provided on nodes 210b-210g. Applications a and b process application transactions received from clients 140 through network 130. Specifically, cluster aliasing causes application transactions for application a to be routed to load balancer 201a and application transactions for application b to be routed to load balancer 201b. Load balancers 201a and 201b then distribute transactions for the applications between nodes 210 to balance the load on the respective nodes 210. In one representative embodiment, load balancers 201a and 201b implement a weighted round-robin distribution algorithm. Load balancers 201a and 201b may be implemented using suitable hardware (e.g., integrated circuitry) and/or using software executing on one or several processors. Load balancers 201a and 201b may be implemented as discrete devices or may alternatively be implemented on one or several nodes 210.

Performance monitors (PM) 212 of some embodiments are software processes that examine the performance of applications. For example, performance monitors 212 may examine the utilization rate of processors, the utilization rates of input/output (IO) resources, the length of time spent processing certain types of transactions, and/or the like. Performance monitors 212 may communicate the performance data to workload managers (WLMs) 211 which are also software processes according to some embodiments.

Service level objectives (SLOs) refer to the desired operating goals or rules associated with applications. The SLOs may define the desired utilization rates, the desired length of time of processing for particular transaction types, and/or the like. If an application does not satisfy one or several SLOs, workload manager 212 may redistribute resources (e.g., processors 213, memory resources, IO resources, operating system resources, and/or the like) between applications. For example, if one application possesses idle resources, WLM 211 may reassign the resources to an under-performing application. The reassigned resources may enable the under-performing application to meet its SLO(s). Additionally, virtual partitions and partition load manager software processes (not shown) could be employed if desired. Further details regarding performance monitors, workload managers, virtual partitions, and partition load managers are discussed in greater detail in U.S. patent Ser. No. 10/206,594, publication number 20030037092, entitled "Dynamic management of virtual partition computer workloads through service level optimization," filed Jul. 26, 2002, which is incorporated herein by reference.

Although one representative embodiment employs workload managers to reassign resources, any suitable resource allocation mechanism or algorithm may be employed. Other variations from system 200 may also be used. For example, representative embodiments need not employ identical server platforms or virtual resources for each cluster node. Differing amounts of processors 213, processors 213 of varying capabilities, and other resource differences may be present on the respective cluster nodes. Additionally, the workload managers or other resource allocation functionality need not be implemented on each cluster node.

Configuration utility 240 of one embodiment is a software process that coordinates the operations of load balancers 201 and cluster nodes 210. In one representative embodiment, configuration utility 240 periodically determines which applications are executed on each cluster node 210 and which nodes possess an instance of WLM 211 or other dynamic resource allocation capability. Furthermore, configuration utility 240 obtains performance data associated with the execution of applications from nodes 210. Configuration utility 240 may also obtain application load characteristics for each of the cluster nodes 210. The application load characteristics may be obtained by examining a workload or other suitable queue as an example. Configuration utility 240 may also examine the resources assigned to each respective cluster node 210. In response to the obtained information, configuration utility 240 calculates sets of weights for load balancers 210a and 201b. For example, in one embodiment, configuration utility 240 may calculate a weight for each node that is related to the number of processors divided by the length of the related workload queue and divided by the processor utilization rate.

FIG. 3 depicts a flowchart for managing operations in a cluster system according to one representative embodiment. FIG. 3 may be implemented using suitable executable instructions or software code for configuration utility 240 as an example. In block 301, nodes in each cluster are identified. The addition of new nodes to one or several clusters is also detected at this block. These operations may be performed by querying administrative servers responsible for managing the respective clusters. In block 302, nodes having WLM capabilities or other suitable dynamic resource allocation capabilities are identified. The identification may occur by examining the processes executing on each cluster node using an appropriate system call or other function call. In block 303, allocation resource data, load data, and/or performance data is collected from the WLMs on the identified nodes. Such information may be obtained by querying WLMs 211 as an example. In block 304, cluster node weights are calculated using the collected data. In block 305, the load balancers are reconfigured. The calculated cluster node weights are provided to the load balancers to direct application transactions using a suitable distribution algorithm. Additionally, if any new nodes were detected and node lists of the appropriate load balancers are updated.

When implemented in software, the elements of the present invention are essentially the code segments to perform the necessary tasks. The program or code segments can be stored in a computer readable medium or transmitted by a computer data signal embodied in a carrier wave, or a signal modulated by a carrier, over a transmission medium. The "computer readable medium" may include any medium that can store or transfer information. Examples of the computer readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The code segments may be downloaded via computer networks such as the Internet, intranet, etc.

FIG. 4 illustrates computer system 400 adapted according to one representative embodiment. Central processing unit (CPU) 401 is coupled to system bus 402. The CPU 401 may be any general purpose CPU. However, the present invention is not restricted by the architecture of CPU 401 as long as CPU 401 supports the inventive operations as described herein. Bus 402 is coupled to random access memory (RAM) 403, which may be SRAM, DRAM, or SDRAM. ROM 404 is also coupled to bus 402, which may be PROM, EPROM, or EEPROM. RAM 403 and ROM 404 hold user and system data and programs as is well known in the art.

Bus 402 is also coupled to input/output (I/O) controller card 405, communications adapter card 411, user interface card 408, and display card 409. I/O card 405 connects to storage devices 406, such as one or more of hard drive, CD drive, floppy disk drive, tape drive, to the computer system. Storage devices 406 may store the software or executable code for controlling the routing of transaction to nodes of a clustered architecture. For example, storage devices 406 may store executable code implementing configuration utility 240 according to one representative embodiment.

Communications card 411 is adapted to couple the computer system 400 to a network 412, which may be one or more of local (LAN), wide-area (WAN), ethernet or Internet network. In an alternative embodiment, the executable instructions defining configuration utility 240 may be received via network 412 through communications card 411. User interface card 408 couples user input devices, such as keyboard 413 and pointing device 407, to the computer system 400. Display card 409 is driven by CPU 401 to control the display on display device 410.

By controlling the distribution of transactions, some representative embodiments may provide a number of advantages. For example, the same number of cluster nodes may be used to provide a greater amount of resources to applications during peak load periods without degrading the performance of other applications. Additionally, cluster nodes may be added to a cluster system and the load balancing functionality will automatically be adjusted to the additional resources without requiring complex manual configuration activities. Moreover, because some representative embodiments control the operations of a cluster system in response to performance data, load data, and other suitable data, cluster nodes need not possess identical processing capabilities or other capabilities. Specifically, applications transactions may be automatically directed to the appropriate cluster nodes in a dynamically changing system.

What is claimed is:

1. A system for operating load balancers for multiple instance applications, comprising:

a plurality of cluster nodes for executing a plurality of applications, wherein at least a subset of said plurality of cluster nodes executes multiple applications of said plurality of applications and includes respective resource allocation modules for assigning resources between said multiple applications in response to performance data associated with said multiple applications;

a plurality of load balancers for distributing application transactions between said plurality of cluster nodes, wherein at least one load balancer of said plurality of load balancers distributes said application transactions of at least one application of said plurality of applications and another load balancer of said plurality of load balancers distributes said application transactions of at least one different application of said plurality of applications; and a load balancer configuration utility that analyzes performance data associated with said multiple applications and said load balancer configuration utility is directly communicatively coupled to said plurality of load balancers and dynamically configures said plurality of load balancers in response to said analysis, wherein said load balancer configuration utility calculates a set of cluster node weights for each of said plurality of load balancers in response to said analysis, wherein said cluster node weights are related to a number of processors divided by a length of a related work load queue and divided by a processor utilization rate, wherein each of said plurality of load balancers distributes application transactions using a round-robin algorithm weighted by a set of said cluster node weights.

2. The system of claim 1 wherein said load balancer configuration utility analyzes application loads associated with respective cluster nodes during analysis of said performance data.

3. The system of claim 1 wherein said load balancer configuration utility submits queries to identify applications executing on said plurality of cluster nodes and configures said plurality of load balancers in response to said querying.

4. The system of claim 1 wherein said load balancer configuration utility autonomously detects an addition of a cluster node to a cluster system and reconfigures at least a subset of said plurality of load balancers in response to said addition.

5. The system of claim 1 wherein said resource allocation modules reassign processor resources in response to performance data.

6. The system of claim 1 wherein said resource allocation modules reassign resources according to service level objectives.

7. The system of claim 1 wherein each of said plurality of cluster nodes comprises a performance monitor process for generating performance data.

8. The system of claim 1 wherein said load balancer configuration utility analyzes resource allocation data associated with respective cluster nodes during analysis of performance data.

9. A method, comprising:

executing a plurality of applications on a plurality of cluster nodes, wherein at least a subset of said plurality of cluster nodes executes multiple applications of said plurality of applications;

dynamically reassigning resources between said multiple applications in response to performance data associated with said multiple applications;

distributing application transactions between said plurality of cluster nodes by a plurality of load balancers according to parameters, wherein at least one load balancer of said plurality of load balancers distributes said application transactions of at least one application of said plurality of applications and another load balancer of said plurality of load balancers distributes said application transactions of at least one different application of said plurality of applications; and dynamically configuring said plurality of load balancers in response to performance data associated with said multiple applications, wherein said load balancer configuration utility calculates a set of cluster node weights for each of said plurality of load balancers in response to said analysis, wherein said cluster node weights are related to a number of processors divided by a length of a related work load queue and divided by a processor utilization rate, wherein said dynamically configuring comprises analyzing application load characteristics of cluster nodes.

10. The method of claim 9 wherein said parameters include said cluster node weights and said distributing application transactions is performed using a round-robin algorithm weighted according to said cluster node weights.

11. The method of claim 9 further comprising:
identifying applications executing on said plurality of cluster nodes; and
dynamically configuring said parameters in response to said identifying.

12. The method of claim 9 further comprising:
detecting an addition of a cluster node to said cluster system; and
dynamically configuring said parameters in response to said detecting.

13. The method of claim 9 wherein dynamically configuring said parameters comprises:
reassigning at least one item from the list consisting of processor resources, memory resources, input/output (IO) resources, and operating system resources.

14. The method of claim 9 further comprising:
operating a respective performance monitoring process on each cluster node of said subset to generate performance data.

15. The method of claim 9 wherein said dynamically reassigning resources comprises:
reassigning resources according to a service level objectives associated with said multiple applications.

16. A computer readable storage medium including executable instructions for operating load balancers for multiple instance applications, comprising:
code for retrieving performance data associated with execution of applications on a plurality of cluster nodes, wherein at least a subset of said plurality of cluster nodes executes multiple applications;
code for calculating multiple sets of cluster node weights using said performance data; and
code for dynamically configuring a plurality of load balancers using said multiple sets of cluster node weights to control distribution of application transactions by said plurality of load balancers to said plurality of cluster nodes, wherein at least one load balancer of said plurality of load balancers distributes said application transactions of at least one application of said plurality of applications and another load balancer of said plurality of load balancers distributes said application transactions of at least one different application of said plurality of applications, wherein said load balancer configuration utility calculates a set of cluster node weights for each of said plurality of load balancers in response to said analysis, wherein said cluster node weights are related to a number of processors divided by a length of a related work load queue and divided by a processor utilization rate, wherein each of said plurality of load balancers distributes application transactions using a round-robin algorithm weighted by a set of said cluster node weights.

17. The computer readable storage medium of claim 16 wherein said code for calculating analyzes application load characteristics of respective nodes.

18. The computer readable storage medium of claim 16 wherein said code for calculating analyzes application resource allocation data associated with respective nodes.

19. The computer readable storage medium of claim 16 further comprising:
code for detecting an addition of a cluster node to said cluster system, wherein said code for calculating calculates at least one revised set of cluster node weights and said code for dynamically configuring reconfigures at least one load balancer using said revised set of cluster node weights.

20. The computer readable storage medium of claim 16 further comprising:
code for identifying applications executed on each of said plurality of cluster nodes.

* * * * *